（12）United States Patent
Awad Amar et al.

(10) Patent No.: US 12,223,467 B2
(45) Date of Patent: Feb. 11, 2025

(54) SYSTEMS AND METHODS FOR INVENTORY ESTIMATION

(71) Applicant: Coupang Corp., Seoul (KR)

(72) Inventors: Hernan Awad Amar, Seattle, WA (US); YoungHoon Jeong, Seoul (KR); Je Kim, Bellevue, WA (US); SeungRok Kim, Seoul (KR); KyuHoon Lim, Seoul (KR); Rajesh Medidhi, Seoul (KR); Smita Mohan, Seoul (KR)

(73) Assignee: COUPANG CORP., Seoul (KR)

( * ) Notice: Subject to any disclaimer, the term of this patent is extended or adjusted under 35 U.S.C. 154(b) by 219 days.

(21) Appl. No.: 17/456,525

(22) Filed: Nov. 24, 2021

(65) Prior Publication Data
US 2023/0162139 A1    May 25, 2023

(51) Int. Cl.
G06Q 10/087 (2023.01)
(52) U.S. Cl.
CPC .................. G06Q 10/087 (2013.01)
(58) Field of Classification Search
None
See application file for complete search history.

(56) References Cited

U.S. PATENT DOCUMENTS 8,732,039 B1*   5/2014   Chen ............... G06Q 10/063
                                                705/26.81
2014/0082660 A1*   3/2014   Zhang ............ H04N 21/25866
                                                725/32
2016/0092830 A1    3/2016   Goulart
2017/0127233 A1*   5/2017   Liang ............... G06Q 30/0261
2019/0320285 A1*  10/2019   Liang ..................... H04W 4/029
2020/0143313 A1*   5/2020   Ohlsson .................. G06N 5/01

(Continued)

FOREIGN PATENT DOCUMENTS

CN   110322203 A   10/2019
CN   113592309 A   11/2021
KR   10-2244568 B1   4/2021

(Continued)

OTHER PUBLICATIONS

International Search Report and Written Opinion in PCT International Application No. PCT/IB2021/062352, dated Aug. 22, 2022 (9 pages).

(Continued)

Primary Examiner — Fateh M Obaid
(74) Attorney, Agent, or Firm — FINNEGAN, HENDERSON, FARABOW, GARRETT & DUNNER, LLP

(57) ABSTRACT

Systems and methods, and computer readable media for target inventory estimation of a geographical region are disclosed. The method receives an item identifier associated with an item for target inventory estimation. The method may access the demand share estimate of the item in the geographical region and the mean and variance estimates of the demand share estimate in the geographical region. The method may then access overall demand forecast data for the item and calculate the mean and variance estimates of the demand forecast. The method may use the generated mean and variance estimates and demand share estimate of the geographical region to determine the target inventory estimation of the region.

19 Claims, 11 Drawing Sheets

(56) References Cited

U.S. PATENT DOCUMENTS

2020/0320465 A1* 10/2020 Yang .................. G06Q 10/087
2020/0320474 A1 10/2020 Hong et al.

FOREIGN PATENT DOCUMENTS

TW       202113709 A    4/2021
TW       113106453       2/2024
TW       I837891         4/2024

OTHER PUBLICATIONS

Office Action issued by the Taiwanese Intellectual Property Office in counterpart TW Application No. 111139490, dated May 29, 2023 (25 pgs.).

Search Report issued by the Taiwanese Intellectual Property Office in counterpart TW Application No. 111139490, dated May 29, 2023 (2 pgs.).

Taiwanese Office Action dated Jun. 28, 2024, for counterpart application No. 113106453.

* cited by examiner login  Sign Up  Service center

Category | Cheese | ? | 🛒
My Orders  Shopping Cart all 'Cheese' (65,586)

filter

☐ Fast Delivery
☐ Imported Product category
All
Food
Silverware
Kitchen utensils
Home electronics digital
Household goods
  View more brands
  Local Milk
  Daily dairy
  Cattle and trees
View more scope
All stars
  4 or more
  3 or more
  2 or more
  1 or more

Gift Cards 65,586 results for 'Cheese'
Related searches: Sliced cheese  baby cheese  cheddar cheese  string cheese  butter  pizza cheese  cream cheese  cheese stick  cubed cheese  parmesan cheese 6 per page

| | | |
|---|---|---|
| CHEDDAR<br><br>FREE Shipping<br>Sliced cheese, 18g,<br>100 pieces<br>(88 won per 10 g)<br>Morning (Thursday)<br><br>(1294) | LOCAL FARM MILK<br><br>Mozzarella cheese,<br>1kg, 2 pieces<br>🚀<br>(103 won per 10 g)<br>Tomorrow (Wed)<br><br>(285) | 100 grams of cheddar<br>sliced cheese,<br>18 grams, 100 pieces<br>(73 won per 10 g)<br>Morning (Thursday)<br><br>(862) |
| REAL GRATED PARMESAN<br><br>Grated Parmesan<br>Cheese, 85g,1 piece<br>🚀<br>(389 won per 10g)<br>Tomorrow (Wed)<br><br>(839) | Mozzarella cheese,<br>1 kg, 1<br>(85 won per 10g)<br>Morning (Thursday)<br><br>(379) | Cheese Heads String<br><br>FREE Shipping<br>1.36 kg of string<br>cheese<br>Morning (Thursday)<br><br>(337) |

FIG. 1B

Favorites Application     login  Sign Up  Service center all

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese
285 Reviews
20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and Content reference | | nutrient | None |

FIG. 1C

SYSTEMS AND METHODS FOR INVENTORY ESTIMATION

TECHNICAL FIELD

The present disclosure generally relates to computerized systems and methods for target inventory estimation. In particular, embodiments of the present disclosure relate to inventive and unconventional systems relate to estimation of the target inventory for an item in a geographical region.

BACKGROUND

Distribution of items to sale and delivery location is an important challenge for retail and wholesale service provider to achieve cheap and timely delivery of ordered items. Most of the current systems and methods to decide the amount of inventory needed to serve uncertain demand require knowledge of the full probability distribution of the demand. However, this full knowledge is rarely available in practice. This is especially true for items with limited data, such as new items, seasonal items, or slow-selling items. Limited data can make it difficult for the current system techniques to make accurate predictions of demand at various sale and delivery locations. Typically, decision makers have estimates for the mean and variance of the demand, and may be willing to make some weak additional assumption (e.g. unimodality), but no additional information about its probability distribution is known.

There are comparatively few existing methods for inventory management that use only partial information about the demand distribution. These methods typically try to minimize an expected cost under the worst possible demand distribution that is compatible with the known information. Notable examples of this so-called min-max approach are Scarf (1957), Gallego and Moon (1993), and Perakis and Roels (2008). Other methods use so-called robust optimization techniques, like those presented in Bertsimas and Thiele (2006), See and Sim (2010), or Mamani, Nassiri, and Wagner (2017). However, all the above methods require the specification of a cost function that includes components that are hard for practitioners to quantify (like the loss of customer goodwill induced by out-of-stocks). Many practitioners prefer to design their inventory management decisions to satisfy a desired quality of service constraint (like a desired in stock rate) rather than minimize a hard to quantify cost. While one can in principle adapt robust optimization techniques like those in Bertsimas and Thiele (2006) to deal with quality of service constraints, these methods use computationally intensive optimization techniques that cannot be scaled to repeatedly making inventory decisions for millions of different items, as is typical in an online retail setting. Existing systems techniques also do not consider the capabilities of item sale and delivery locations.

Therefore, there is a need for inventory management systems that (i) use only limited information about the demand distribution, like mean, variance, and unimodality; (ii) are designed to guarantee desired quality of service constraints; and (iii) are not computationally intensive, so that they can easily scale to making periodic inventory decisions for millions of items.

SUMMARY

One aspect of the present disclosure is directed to a system for target inventory estimation of a geographical region. The system includes at least one non transitory storage medium comprising instructions and at least one processor executing the instructions for performing operations. The operations may include receive an item identifier associated with an item for inventory estimation as an input to the system for target inventory estimation for the item in a geographical region, access demand share estimate and mean and variance estimates of the demand share estimate of the item associated with the received item identifier in the geographical region, determine overall demand forecast of the item associated with the received item identifier, wherein the overall demand forecast of the item is based on order data associated with the item, calculate mean and variance estimates of the overall demand forecast of the item associated with the received item identifier, wherein the mean and variance estimates of the overall demand forecast of the item is based on previously determined overall demand forecast of the item, determine service level associated with the geographical region, wherein the service level of the geographical region is based on availability of one or more items at the geographical region to satisfy orders for the one or more items, generate target inventory estimation of the item associated with the received item identifier in the geographical region based on the mean and variance estimates of the overall demand forecast of the item, mean and variance estimate of the demand share estimate of the item in the geographical region, wherein the generated target inventory estimation meets the service level of the geographical region, and respond to the received item identifier with the generated target inventory estimation.

Another aspect of the present disclosure is directed to a method for target inventory estimation of a geographical region. The method comprising: receiving an item identifier associated with an item for inventory estimation as input to the system for target inventory estimation for the item in a geographical region, accessing demand share estimate and mean and variance estimates of the demand share estimate of the item associated with the received item identifier in the geographical region, determining overall demand forecast of the item associated with the received item identifier, wherein the overall demand forecast of the item is based on order data associated with the item, calculating mean and variance estimates of the overall demand forecast of the item associated with the received item identifier, wherein the mean and variance estimates of the overall demand forecast of the item is based on previously determined overall demand forecast of the item, determining service level associated with the geographical region, wherein the service level of the geographical region is based on availability of one or more items at the geographical region to satisfy order for the one or more items, generating target inventory estimation of the item associated with the received item identifier in the geographical region based on the mean and variance estimates of the overall demand forecast of the item, mean and variance estimates of the demand share estimate of the item in the geographical region, wherein the generated target inventory estimation meets the service level of the geographical region, and responding to the received item identifier with the generated target inventory estimation.

Yet another aspect of the present disclosure is directed to a system for target inventory estimation of a geographical region. The system may include at least one non transitory storage medium comprising instructions and at least one processor executing instructions for performing operations. The operations may include receive an item identifier associated with an item for inventory estimation as an input to the system for target inventory estimation for the item in a geographical region, access demand share estimate and mean and variance estimates of the demand share estimate of the item associated with the received item identifier in the geographical region, determine overall demand forecast of the item associated with the received item identifier, wherein the overall demand forecast of the item is based on order data associated with the item, calculate mean and variance estimates of the overall demand forecast of the item associated with the received item identifier, wherein the mean and variance estimates of the overall demand forecast of the item is based on previously determined overall demand forecast of the item, determine service level associated with the geographical region, wherein the service level of the geographical region is based on availability of one or more items at the geographical region to satisfy orders for the one or more items, generate target inventory estimation of the item associated with the received item identifier in the geographical region is based on the mean and variance estimates of the overall demand forecast of the item, mean and variance estimate of the demand share estimate of the item in the geographical region wherein the generated target inventory estimation meets the service level of the geographical region, generate target inventory estimation of the item associated with the received item identifier in a first set of geographical regions of the sets of geographical regions based on the mean and variance estimates of the overall demand forecast of the item, mean and variance estimates of the demand share estimate of the item in the geographical region wherein the generated target inventory estimation of item in the first set of geographical regions meets the service level of the first set of geographical regions, wherein the first set of geographical regions is associated with a first service type, aggregate a second set of geographical regions of the sets of geographical regions, wherein the second set of geographical regions is associated with second service type, generate target inventory estimation for the combined target inventory estimation for the first service and second service type, wherein the combined target inventory estimation for the first service type and the second service type is based on aggregation of the target inventor estimation of the first set of geographical regions and the second set of geographical regions, and respond to the received item identifier with the generated target inventory estimation for the combined target inventory estimation for the first service and second service type.

Other systems, methods, and computer-readable media are also discussed herein.

BRIEF DESCRIPTION OF THE DRAWINGS

FIG. 1B depicts a sample Search Result Page (SRP) that includes one or more search results satisfying a search request along with interactive user interface elements, consistent with the disclosed embodiments.

FIG. 1C depicts a sample Single Detail Page (SDP) that includes a product and information about the product along with interactive user interface elements, consistent with the disclosed embodiments.

DETAILED DESCRIPTION

Figure 1A:
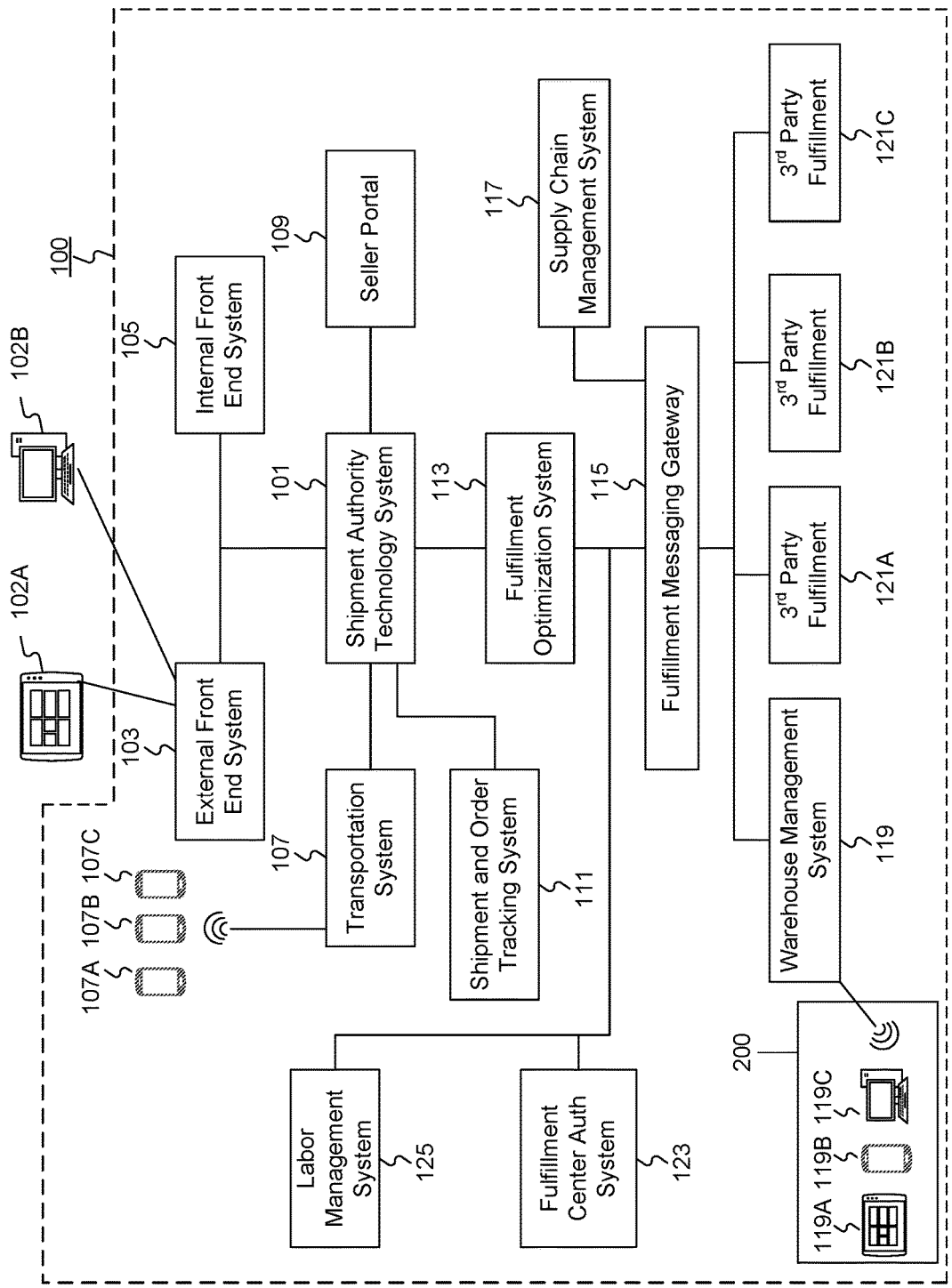
FIG. 1A is a schematic block diagram illustrating an exemplary embodiment of a network comprising computerized systems for communications enabling shipping, transportation, and logistics operations, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for learning and predicting the sale and delivery patterns of new items and seasonal utilization variations of existing items. A system may gain this intelligence using machine learning models that can handle large amounts of item utilization data as training data to predict item utilization patterns. Item utilization data may include items order processing at sale and delivery centers. The system can also handle limited data availability circumstances by providing the data as input to previously training machine learning models with related item data. By able to predict item utilization patterns the system can understand target inventory estimation of items and make distribution estimates of items.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
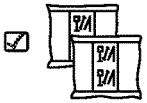
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200.

3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
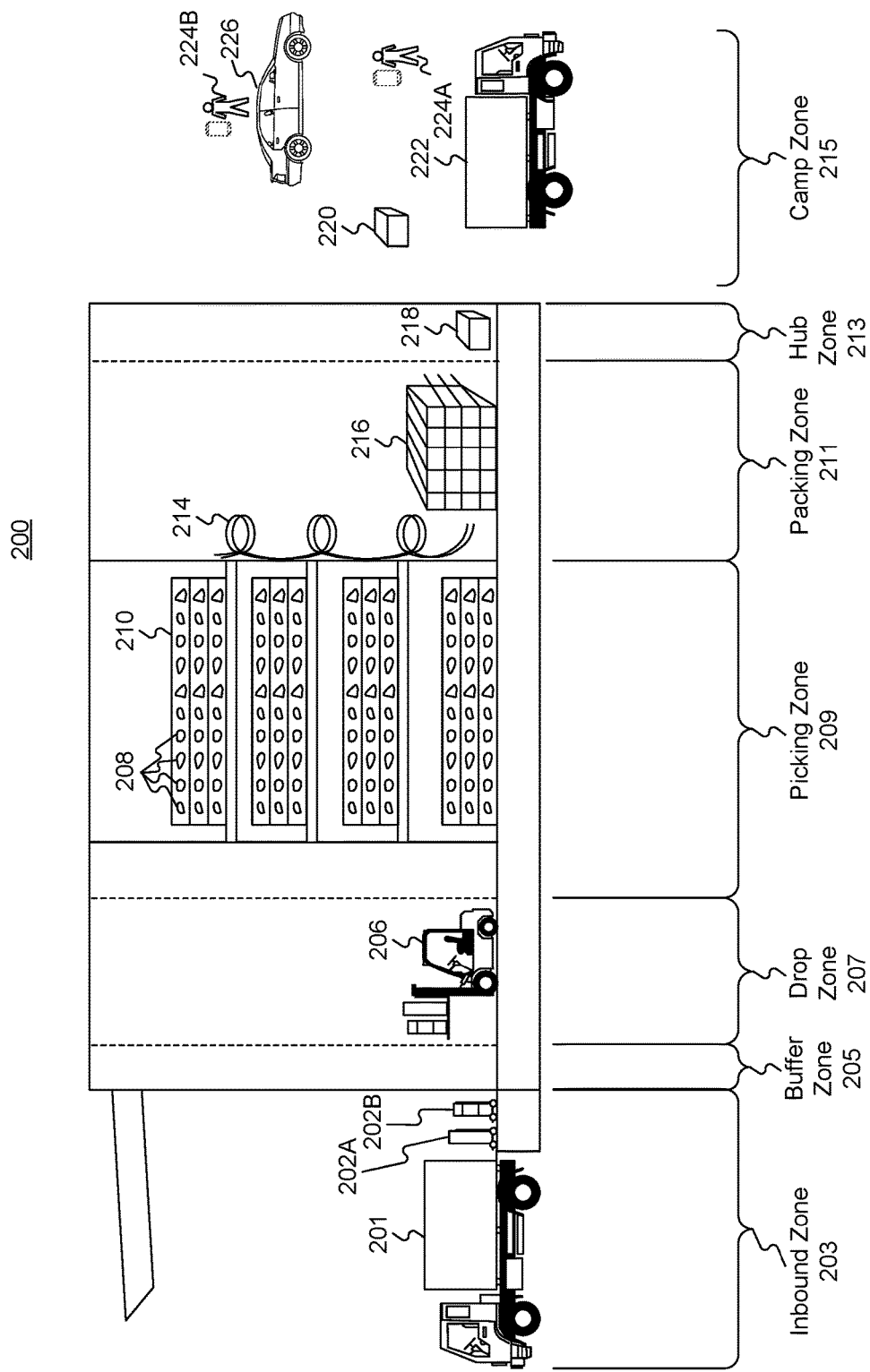
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
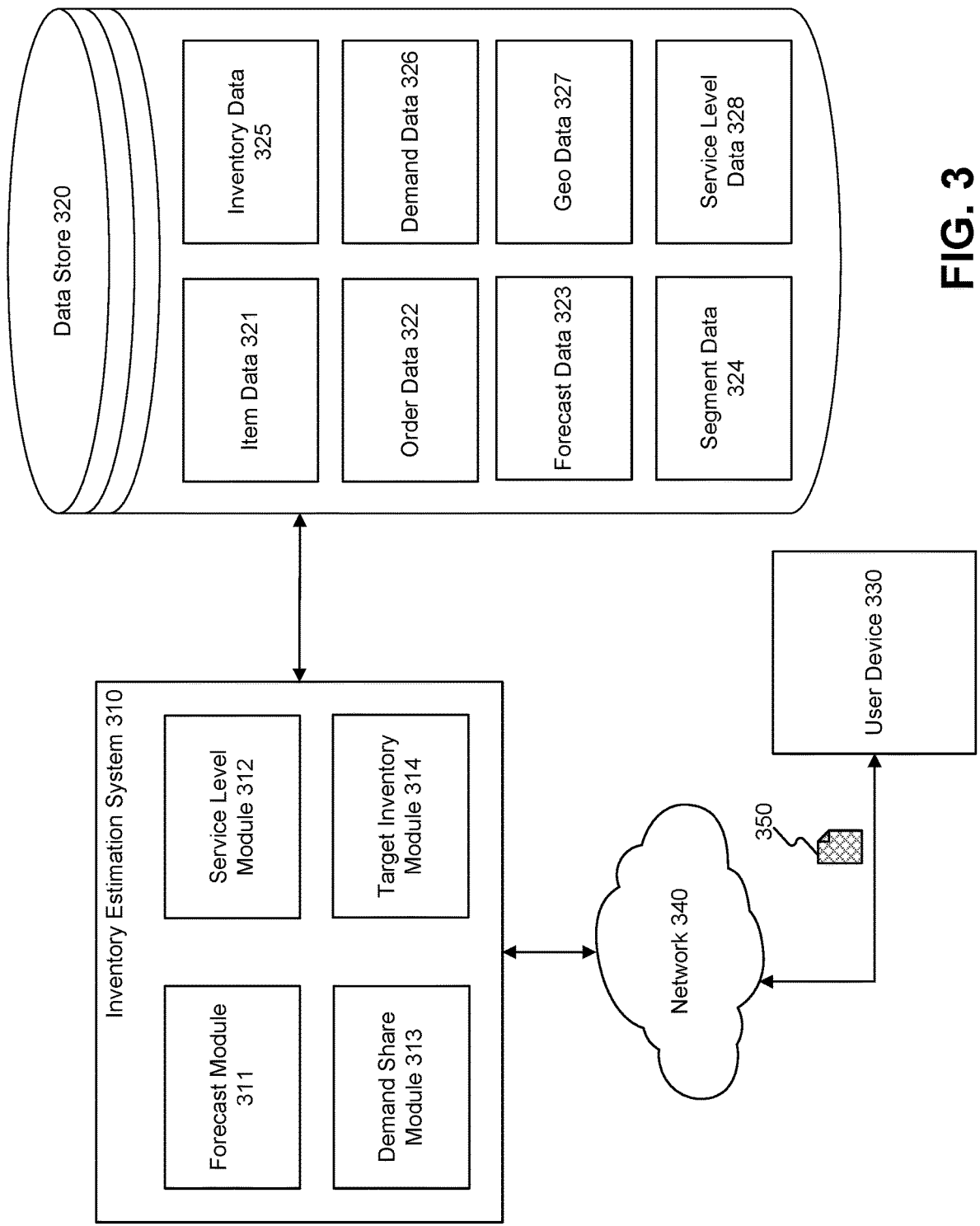
FIG. 3 is a block diagram of exemplary target inventory estimation system, consistent with the disclosed embodiments.

FIG. 3 is a block diagram of an exemplary target inventory estimation system, consistent with the disclosed embodiments. As illustrated in FIG. 3, inventory estimation system 310 connects with data store 320 and user device 330 over network 340. Inventory estimation system 310 components may include forecast module 311, service level module 312, demand share module 313, target inventory module 314.

Inventory estimation system 310, in some embodiments, may be implemented as a computer system that performs forecasting item target inventory estimation for a specified region. Each component in inventory estimation system 310 may represent a software program function or the whole software program(s). A processor (for example processors 416-417 of FIG. 4) can execute software functions and programs representing components in a target inventory estimation system. The processor can be a virtual or physical processor of a computing device. Computing devices executing the software functions or programs may include a single processor or core or multiple processors or cores or maybe multiple computing devices spread across a distributed computing environment, network, cloud, or virtualized computing environment.

Forecast module 311 may forecast the overall demand for an item based on the data related to the item's orders in data store 320. Forecast module 311 may also consider searches for the item received by front end system 103 (as shown in FIG. 1) to determine the item's overall demand. Forecast module 311 may receive an item identifier, such as an SKU number or a barcode for an item, as input to determine the overall demand for the item. User device 330 may share a request with an item identifier to determine the item's overall demand. In some embodiments, user device 330 may request overall demand data for multiple items. In some embodiments, target inventory module 314 may request forecast module 311 to provide the overall demand forecast for an item. Forecast module 311 may determine the national forecast as overall demand for an item based on the item's previous orders stored as order data 322. Inventory estimation system 310 may utilize the overall demand of the item to compute the target inventory estimation for a specific region at a specific time.

Service level module 312 may determine service level requirements of various geographical regions served by system 100. Service level of a geographical region may be a set of requirements that need to be satisfied by system 100 serving item orders in that region. Service level module 312 may manage the target inventory levels at fulfillment centers (e.g., 3rd party fulfillment centers 121A-C) in a geographical region. Service level module 312 may manage inventory levels by balancing between storage capacity of fulfillment centers in the geographical region and the estimated orders of items that may need to be served by the fulfillment centers in the geographical region. Service level module 312 may need to know the potential orders that may need to be served by the fulfillment centers in the geographical region by reviewing order data 322. In some embodiments, service level module 312 may communicate with shipment and order tracking system 111 to determine order needs served by a fulfillment center. Fulfillment optimization system 113 may request service level module 312 to determine and help maintain highest service levels in all geographical regions for all items and for all service types (such as overnight shipment, fragile item shipment, etc.).

In some embodiments service level module 312 may determine geographical regions to determine service level of each geographical region. Geographical regions identified by service level module 312 may be used to calculate inventory estimation of an item at various granularity levels. Granularity level may indicate the size of geographical region served by system 100 to allow purchase and shipment of items. Granularity levels may define a hierarchy of larger geographical regions at higher levels of granularity which contain smaller geographical regions at lower levels of granularity. For example, granularity levels may include neighborhood, a postal code, a district, state, and country; each region may be included in another larger geographical region where system 100 may ship purchased items. Hierarchy of geographical regions as served by system 100 are described in detail in FIG. 5 description below.

Geographical regions may include portions of overall demand for the item determined by forecast module 311. Service level module 312 may determine the smallest geographical region for service level determination and target inventory estimation calculation which may be associated with a fulfillment center (e.g., FC 200 of FIG. 2). Service level module 312 may also determine larger geographical regions that may contain the smallest geographical regions. For example, a larger geographical region may contain all $3^{rd}$ party Fulfillment centers 121A-C (as shown in FIG. 1). Service level module 312 may determine non-overlapping geographical regions for service level determination and inventory estimation of an item at different geographical granularity levels. Service level module 312, upon determining the geographical regions related to inventory estimation requested item or service level of a geographical region, may store the data in data store 320. In some embodiments, inventory estimation system 310 may request service level module 312 to determine all possible regions.

Demand share module 313 may determine the share of the overall demand for an item in a geographical region. Demand share module 313 may determine the share of the overall demand by reviewing orders of the item in the identified region. Demand share module 313 may request the shipment and order tracking system 111 (as shown in FIG. 1) for the item's total orders. In some embodiments, demand share module 313 may review order data 322 directly to identify the order share for each fulfillment center (e.g., FC 200) and encompassing geographical regions. Demand share module 313 uses the total order share data to determine the item's demand share at each geographical region determined by service level module 312. Demand share module 313 may include a machine learning model trained using item order data to estimate the share of overall future orders.

In some embodiments, demand share module 313 may determine the demand share of a set of items related to each other. Demand share module 313 may determine the related items using a pre-defined set of categories. In some embodiments, demand share module 313 may review order data 322 to identify the related items. For example, demand share module 313 may review order data to determine the items' purchase patterns, such as items purchased together to determine the related items. Demand share module 313 may determine each geographical region's share in the overall demand for the item using overall demand data based on past order data from shipment and order tracking system 111 and expected future orders from forecast module 311 and geographical regions data from service level module 312. Demand share module 313 may only determine the smallest geographical regions' demand share, such as a fulfillment center (e.g., FC 200) alone.

Target inventory module 314 may determine the target inventory estimation of an item in a particular region. Target inventory module 314 may compute inventory estimation of an item using demand share estimate of the item in the particular region as computed by demand share module 313. Target inventory module 314 may distribute the overall demand for an item based on each region's demand share estimates to calculate the target inventory estimate of a particular region. Target inventory module 314 may rely directly on the demand share based on the amount of order data available in calculating demand shares of geographical regions determined by service level module 312. In such cases, target inventory module 314 may rely on a set of items related to the item needing inventory estimation determination. Target inventory module 314 may need to compute the target inventory estimate of the set of items related to the item requesting target inventory estimation.

Target inventory module 314 may use segment data 324 to determine the set of items associated with the item in need of target inventory estimation. Segment data 324 may include pre-defined segments of item groupings that may be used as sets of related items. In some embodiments, segment data 324 may be populated dynamically by determining the related items forming a set of items grouping. Target inventory module 314 may populate segment data 324 by reviewing order data 322 to find groupings of items purchased together to identify related items. Target inventory module 314 may also communicate with shipment and order tracking system 111 to review item orders to identify related items. For example, items ordered together may be considered related items. In some embodiments, target inventory module 314 may communicate with front end system 103 (as shown in FIG. 1) to determine searches for items conducted and the items reviewed by users of front end system 103 to determine related items to be included as a grouping in segment data 324.

Target module 314, upon determining the related items to a target inventory estimation of a requested item, may calculate target inventory estimation of the related items. Target inventory module 314 may use demand share estimation of a set of items to compute demand share estimate of a particular item in a particular region. Target inventory module 314 may compute target inventory estimation of multiple geographical regions comprising the requested item target inventory estimation's particular region. Target inventory module 314 may aggregate the target inventory estimation of multiple geographical regions to calculate an item's target inventory estimation in a particular region. Target inventory module 314 may determine inventory estimations of geographical regions that meet the service levels of the geographical regions as determined by service level module 312. Target inventory module 314 may request service level module 312 to provide the service level of the region in which inventory estimation system 310 was request for target inventory estimation of an item.

In various embodiments, data store 320 may take several different forms. For example, data store 320 may be an SQL database or NoSQL database, such as those developed by MICROSOFT™, REDIS, ORACLE™, CASSANDRA, MYSQL, various other types of databases, data returned by calling a web service, data returned by calling a computational function, sensor data, IoT devices, or various other data sources. Data store 320 may store data that is used or generated during the operation of applications, such as forecast module 311, service level module 312, demand share module 313, and target inventory module 314. For example, if service level module 312 is configured to identify regions associated with target inventory estimation, data store 320 may provide item data 321 and order data 322 as information about orders and the items ordered in various regions. Similarly, if inventory estimation system 310 is configured to provide a previously identified segment data 324, data store 320 may generate segment data 324 associated with an item in data store 320. In some embodiments, data store 320 may be fed data from an external source, or the external source (e.g., server, database, sensors, IoT devices, etc.) may be a replacement.

Item data 321 may include item related information, including item identifier, item name. Item data 321 may also include the availability of an item at various geographical regions such as fulfillment center 200. SCM system 117 may provide information about the availability of an item at fulfillment center to data store 320 to populate item data 321. In some embodiments, item data 321 may include item search data provided by front end system 103. Item data 321 may be tabular data with alphanumeric fields for storing the item identifiers and item names. In some embodiments, item data 321 may be comma separated alphanumeric values.

Order data 322 may include item purchase orders as conducted using FO system 113. Order data 322 include information about various items of item data 321 sold and shipped from various fulfillment centers (e.g., FC 200, $3^{rd}$ Party fulfillment centers 121A-C). Order data 322 may also include tracking data provided by shipment and order tracking system 111. Order data 322 may be tabular data with alphanumeric fields with information about order shipment address, packaging type (for example, special frozen item packaging), and shipment type (for example, overnight shipment). Order data 322 may be present in other formats such as a comma separated text file or as a JSON file.

Forecast data 323 may include the overall demand forecast of items listed in item data 321. Forecast data 323 may include demand forecast for various geographical regions supported by fulfillment centers. In some embodiments, forecast data 323 may be dynamically populated by forecast module 311. Forecast data 323 may be structured in a tabular manner with numeric values representing percentage of overall demand. Forecast data 323 may also include whole digit fields indicating the amount of an item needed for satisfying all orders in different geographical regions.

Segment data 324 may include data about sets of items of item data 321 related to each other. Segment data 324 may include overlapping sets of items with common items. Segment data 324 may include sets of data as defined for different geographical regions served by system 100. Segment data 324 may regularly be updated by demand share module 313. In some embodiments, service level module 312 identification of geographical regions may trigger the determination of new sets of data to store in segment data 324. Segment data 424 may include alphanumeric fields of item identifiers that together for a segment. Segment data 424 may be structured in other formats such as comma separated values in a text file or as a JSON file.

Inventory data 325 may include details of inventory of each item of item data 321. Item details includes inventory data 325 may include a reference field to the item in item data 321. The reference field may be a unique item identifier such as a SKU product number or name. Inventory data 325 may include details inventory availability in various geographical regions (such as $3^{rd}$ party fulfillment centers 121A-C of FIG. 1). Inventory data 325 may be used along with target inventory estimation determined by inventory estimation system 310 to send the appropriate amount of inventory of an item to a fulfillment center (e.g., $3^{rd}$ party fulfillment centers 121A-C).

Demand data 326 may include overall demand estimation of an item that can be ordered using front end 103 of system 100. Demand data 326 may include the mean and variance (standard deviation) of overall demand estimation of the item. In some embodiments, demand data 326 may include demand share data of an item of item data 321 in a geographical region. In some embodiments, demand data 326 may include mean and variance of demand estimation in a particular geographical region and may be calculated using mean and variance of the overall demand estimation and demand share of the geographical region.

Geo data 327 may include geographical regions as defined by system 100 based on distribution of fulfillment centers (e.g., fulfillment centers 121A-C). Requirements of a geographical region may include service level to be met by that region is described below. A detailed description of hierarchical geographical regions with differing service levels is defined in FIG. 5 description below.

Service level data 328 may include service level requirements for item order fulfillment. For example, in some embodiments, the service level of a geographical region may require a certain number of item orders of the total item order to be fulfilled by fulfillment centers in that geographical region. Service level of a geographical region (e.g., sub region 510 of FIG. 5) may be defined by a user of inventory system 310. Service levels may be defined dynamically by a user of user device 330 connected to inventory system 310 over network 340. For example, config file 350 may include the configuration for service level of the geographical region where an item's target inventory estimation is requested. In some embodiments, service level of a geographical region may be based on number of orders of the orders directed to fulfillment centers (e.g., $3^{rd}$ party fulfillment centers 121A-C) in the geographical region are met and shipped from those fulfillment centers. Service level values may be stored in service level data 328 and used for future target inventory requests for an item in a geographical region. Service level data 328 may be associated with the geographical regions defined in geo data 327 and items in item data 321.

Service level of a geographical region defined in service level data 328 may need to be refreshed at regular intervals of time. The time interval for refreshing service levels may be defined statically or updated dynamically using a configuration (e.g., inventory estimation request 350). In some embodiments, the time interval to refresh service level values of geographical regions may include default values. Service level default values may be determined by a machine learning model. The machine learning model may take as input overall storage and throughput capacities in the fulfillment centers (e.g., FC 200 of FIG. 2) that serve a region. In some embodiments, machine learning model may take as input past order data of order data 322 for the item in a geographical region and the inventory levels of an item from inventory data 325.

System 100 may have triggers for other events to send requests to update service level data of a geographical region in service level data 328. In some embodiments, inventory estimation system 310 may have the ability to configure target inventory estimation trigger events. A user of inventory estimation system 310 may configure the trigger event for inventory estimation system 310 to refresh service level data in a configuration file (e.g., inventory estimation request 350). Service level of a geographical region may be defined based on various factors of items, orders and types of service (such as overnight service).

User device 330 may make a request to access target inventory estimation data for a particular region to the modules in inventory estimation system 310. Modules in inventory estimation system 310 may need to execute one or more functions to retrieve data requested by user device 330. The execution of the functions may result in database access requests sent by the modules in inventory estimation system 310 to other modules within it. The database access requests sent by modules in inventory estimation system 310 may depend on the type of item or time of day/year. For example, user devices accessing the same item order data may result in different sets of functions of inventory estimation system 310's modules executed by a processor to retrieve different item target inventory estimations based on the region and time for target inventory estimations. For instance, if the item is a seasonal item, such as cinnamon flavor, then demand peaks during the holiday season. In addition, in some embodiments, modules in inventory estimation system 310 may be accessed by other automated applications of system 100 without the direct involvement of a user. This may occur, for example, in IoT (Internet of Things) environments, virtualized computing environments (e.g., involving instantiated virtual machines, containers, or serverless code instances), or in other environments involving application-to-application communications.

User device 330 may forward target inventory estimation requests to inventory estimation system 310 over network 340. The requests for information in data store 320 may also optionally be received via network 340. Network 340 may take various forms. For example, network 340 may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, network 340 may include an on-premises (e.g., LAN) network, while in other embodiments, network 340 may include a virtualized (e.g., AWS™, Azure™, IBM Cloud™, etc.) network. Further, network 340 may in some embodiments be a hybrid on-premises and virtualized network, including components of both types of network architecture.

User device 330 may send an inventory estimation request 350 over network 340 to inventory estimation system 310. Inventory estimation request 350 may include details of item and region for computing target inventory estimation of an item in a region. In some embodiments, inventory estimation request 350 may include details of sets of items related to the requested target inventory estimation item. Inventory estimation request 350 may include other configuration data to configure the behavior of modules of inventory estimation system 310. For example, inventory estimation request 350 may include a configuration of time interval to update overall demand of item in forecast data 323 and set of related items in segment data 324. Inventory estimation system 310 upon receiving the inventory estimation request 350 over network begins computation of target inventory estimation of an item in a particular region.

Figure 4:
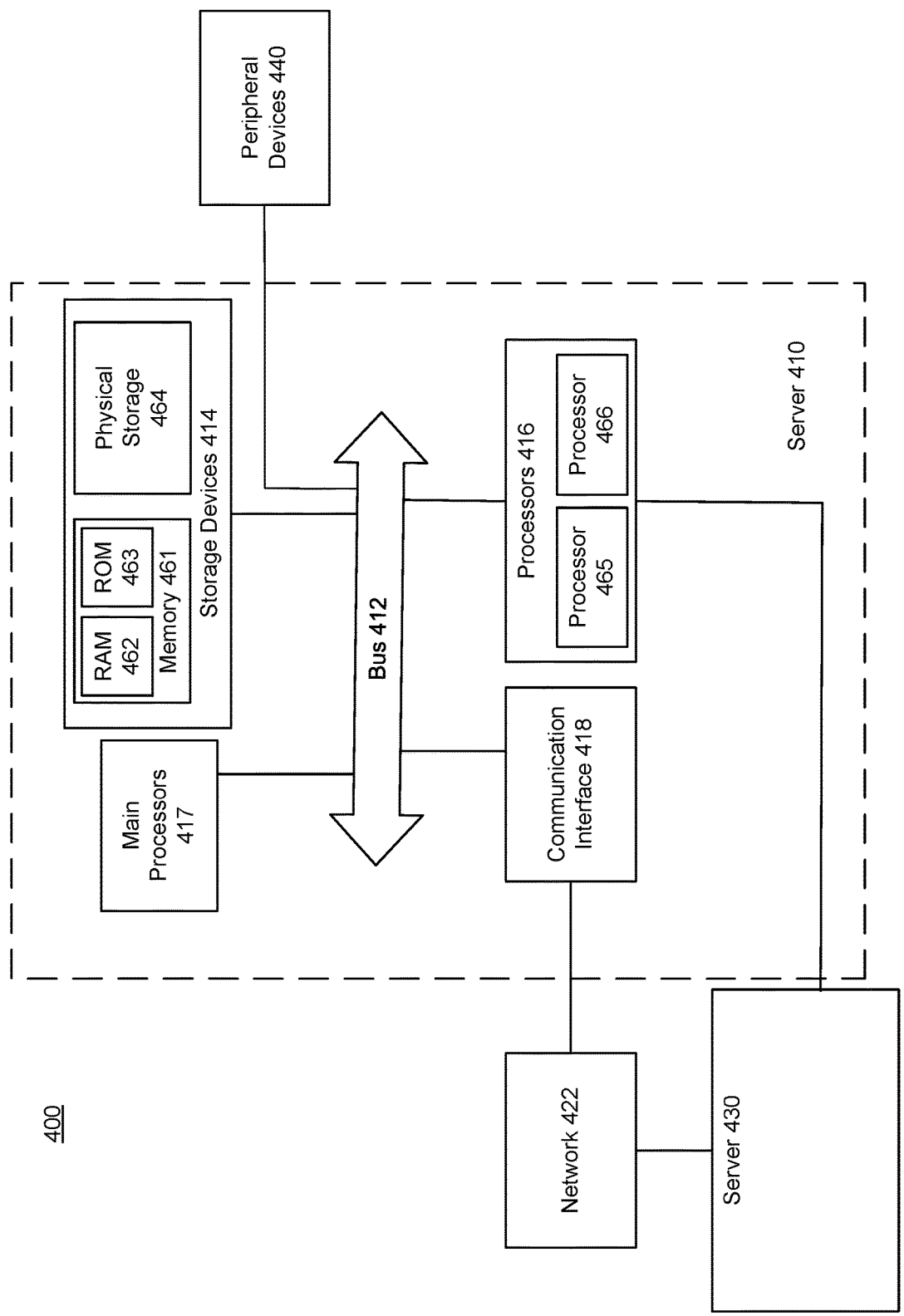
FIG. 4 illustrates a schematic diagram of an exemplary server of a distributed system, according to some embodiments of the present disclosure.

FIG. 4 illustrates a schematic diagram of an exemplary server of a distributed system, according to some embodiments of the present disclosure. According to FIG. 4, server 410 of distributed computing system 400 comprises a bus 412 or other communication mechanisms for communicating information, one or more processors 416 communicatively coupled with bus 412 for processing information, and one or more main processors 417 communicatively coupled with bus 412 for processing information. Processors 416 can be, for example, one or more microprocessors. In some embodiments, one or more processors 416 comprises processor 465 and processor 466, and processor 465 and processor 466 are connected via an inter-chip interconnect of an interconnect topology. Main processors 417 can be, for example, central processing units ("CPUs").

Server 410 can transmit data to or communicate with another server 430 through a network 422. Network 422 can be a local network, an internet service provider, Internet, or any combination thereof. Communication interface 418 of server 410 is connected to network 422, which can enable communication with server 430. In addition, server 410 can be coupled via bus 412 to peripheral devices 440, which comprises displays (e.g., cathode ray tube (CRT), liquid crystal display (LCD), touch screen, etc.) and input devices (e.g., keyboard, mouse, soft keypad, etc.).

Server 410 can be implemented using customized hard-wired logic, one or more ASICs or FPGAs, firmware, or program logic that in combination with the server causes server 410 to be a special-purpose machine.

Server 410 further comprises storage devices 414, which may include memory 461 and physical storage 464 (e.g., hard drive, solid-state drive, etc.). Memory 461 may include random access memory (RAM) 462 and read-only memory (ROM) 463. Storage devices 414 can be communicatively coupled with processors 416 and main processors 417 via bus 412. Storage devices 414 may include a main memory, which can be used for storing temporary variables or other intermediate information during execution of instructions to be executed by processors 416 and main processors 417. Such instructions, after being stored in non-transitory storage media accessible to processors 416 and main processors 417, render server 410 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 416 or main processors 417 for execution. For example, the instructions can initially be carried out on a magnetic disk or solid-state drive of a remote computer. The remote computer can load the instructions into its dynamic memory and send the instructions over a telephone line using a modem. A modem local to server 410 can receive the data on the telephone line and use an infra-red transmitter to convert the data to an infra-red signal. An infra-red detector can receive the data carried in the infra-red signal, and appropriate circuitry can place the data on bus 412. Bus 412 carries the data to the main memory within storage devices 414, from which processors 416 or main processors 417 retrieves and executes the instructions.

Inventory estimation system 310 or one or more of its components may reside on either server 410 or 430 and may be executed by processors 416 or 417. System 100 or one or more of its components may also reside on either server 410 or 430. In some embodiments, the components of inventory estimation system 310 and/or system 100 may be spread across multiple servers 410 and 430. For example, inventory estimation system 310 components 311-314 may be executed on multiple servers.

Figure 5:
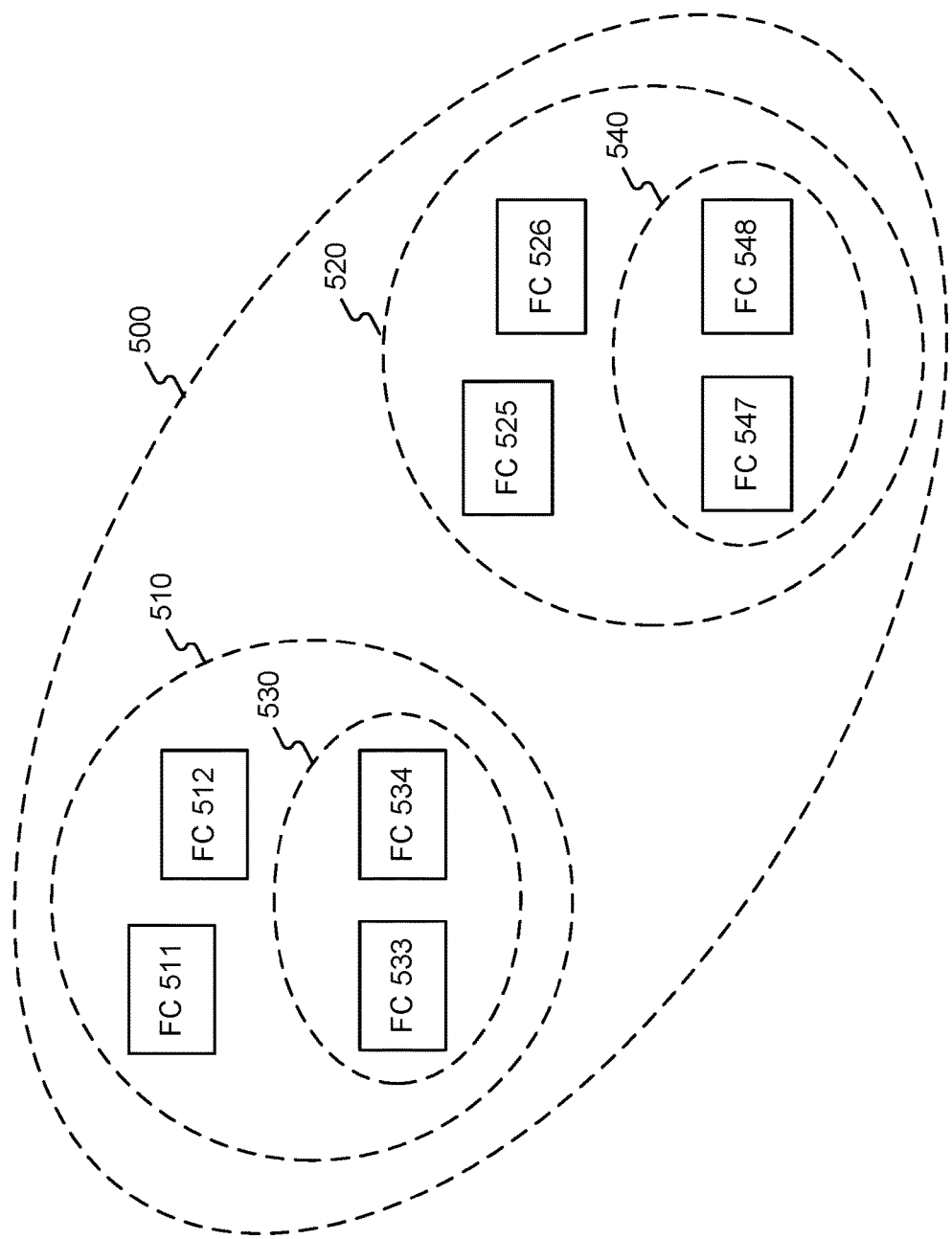
FIG. 5 illustrates a hierarchical set of geographical regions for inventory management, consistent with the disclosed embodiments.

FIG. 5 illustrates a hierarchical set of geographical regions for inventory management, consistent with the disclosed embodiments. As illustrated in FIG. 5, hierarchical set of geographical regions may include an overall region 500 served by system 100. Overall region 500 may represent all geographical regions from where orders are received by system 100.

Overall region 500 may be served by system 100 for orders received via external front end system 103 (as shown in FIG. 1). Overall region 500 may include sub regions 510 and 520. Sub regions 510 and 520 may include fulfillment center. In some embodiments, sub regions 510 and 520 may include groupings of fulfillment centers 530 and 540. Fulfillment center groups 530 and 540 may be grouped by types of service or types of items offered by fulfillment centers part of the group. For example, fulfillment centers 533 and 534 may both offer overnight shipping service. In another instance, fulfillment centers 547 and 548 of group 540 may both ship groceries and have same value for service level.

In some embodiments, a fulfillment center may be part of different geographical regions based on the items served by the fulfillment centers. In some embodiments, fulfillment centers groups 530 and 540 may be based on the item whose target item inventory estimation was requested by a user of user device (e.g., user device 340 of FIG. 1).

System 100 may divide overall region 500 into sub regions 510 and 520 according to fulfillment capabilities and fulfillment costs to different regions 510 and 520. In some embodiments, system 100 may divide overall region 500 into sub regions 510 and 520 to uniformly distribute types of services offered by fulfillment centers (e.g., FC 200 of FIG. 2). In some embodiments, sub regions 510 and 520 may be prepared based on number of orders and type of orders requested by a user of system 100.

Figure 6:
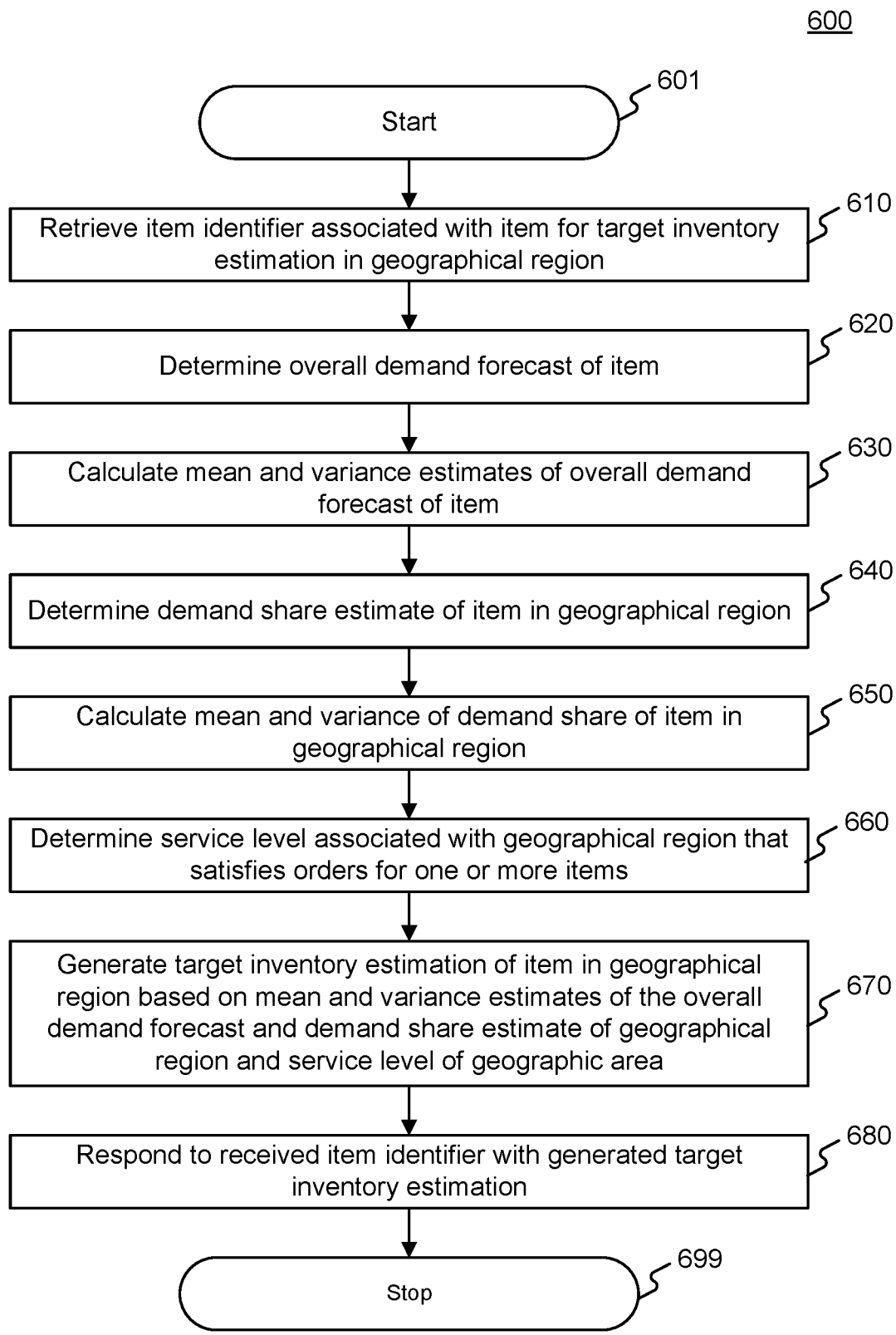
FIG. 6 is an illustrative flow chart of a method for determining inventory estimation of an item in a geographical region, consistent with the disclosed embodiments.

FIG. 6 is an illustrative flow chart of a method for determining target inventory estimation of an item in a region, consistent with the disclosed embodiments. In some embodiments, the steps of method 600 may be performed by inventory estimation system 310 for purposes of illustration. It will be appreciated that the illustrated method may be altered to modify the order of steps, or further include additional steps.

In step 610, inventory estimation system 310 may retrieve an item identifier associated with an item. Inventory estimation system 310 may retrieve item identifier upon receiving a request (e.g., inventory estimation request 350 of FIG. 1) for target inventory estimation of an item. Inventory estimation system 310 may receive an automated inventory estimation request for each item at regular intervals of time. For example, inventory estimation system 310 may receive an inventory estimation request for an item at the end of the day to recompute any changes to inventory estimation of that item in different geographical regions served by system 100.

In some embodiments, inventory estimation system 310 may receive an inventory estimation request upon system 100 observing a change in orders for the inventory estimation requested item beyond a threshold amount. Inventory estimation system 310 may receive inventory estimation requests for an item when a percentage change of orders for the item in a geographical region is above a threshold amount. Shipment and order tracking system 111 may trigger inventory estimation requests for an item and send to inventory estimation system 310. System 100 may have triggers for other events to send inventory estimation requests of an item. In some embodiments, inventory estimation system 310 may have the ability to configure inventory estimation trigger events. A user of inventory estimation system 310 may configure the interval and or trigger event for inventory estimation system 310 to retrieve an item identifier in a configuration file (e.g., inventory estimation request 350).

In some embodiments, inventory estimation system 310 may need to transform the received request to retrieve the item identifier. For example, the transformation of a request may include looking up an item name in item data 321 to retrieve an item identifier. Item identifier may be an alphanumeric string uniquely representing the item. In some embodiments, the transformation may include identifying a new item identifier. For example, the received request may include an item identifier for a discontinued item, and the transformation may provide an identifier of the new version of the item. Inventory estimation system 310 may request forecast module 311 to perform a transformation and/or retrieval of item identifier corresponding to requested target inventory estimation item.

In step 620, inventory estimation system 310 may access the overall demand forecast for an item using the retrieved item identifier. Inventory estimation system 310 may use order data 322 to determine the overall demand forecast of an item. In some embodiments, inventory estimation system 310 may communicate through FMG 115 to determine past order fulfillment of item orders by FC 200 and $3^{rd}$ party fulfillment centers 121A-C to forecast overall demand for the item. Inventory estimation system 310 may also communicate with WMS 119 to get live item order fulfillment updates through mobile devices 119 A-C belonging to FC 200.

In step 630, inventory estimation system 310 may calculate mean and variance estimates of overall demand forecast of the item. Inventory estimation system 310 may review the previously computed overall demand forecast for the item. Inventory estimation system 310 may retrieve the previously determined overall demand forecast for an item from demand data 326. In some embodiments, inventory estimation system 310 may review order data 322 to compute the mean and variance demand forecast of the item. In some embodiments, inventory estimation system 310 may communicate with shipment and order tracking system 111 to determine mean and variance estimates of the demand forecast of the item.

In step 640, inventory estimation system 310 may evaluate an item's demand share estimate in the geographical region defined in the item estimation request 350 received in step 610. Demand share module 313 may review order data 322 associated with fulfillment centers in a geographical region to determine a geographical region's demand share for an item.

Demand share module 313 may determine a share of orders processed by fulfillment centers in a geographical region using order data 322. Demand share module 313 may consider order data from a defined period to determine the share of orders. In some embodiments, demand share module 313 may determine a share of the item's orders in a geographical region at regular intervals of time. The time interval may depend on the type of item. For example, a fast-selling item may need share determination at regular intervals, and slow-selling item share determination may occur over a long period of data. In some embodiments, a user may configure the time interval of orders to use to determine demand share. Demand share module 313 may consider seasonal demand when past order data is used to generate demand share estimation. For example, demand share module 313 may review past order data from the same time period of previous years in computing demand share estimation for a particular geographical region. Demand share module 313 may store demand share estimation associated with an item and/or segment of items in data store 320.

In some embodiments, inventory estimation system 310 may determine a set of item identifiers associated with the requested target inventory estimation item's identifier retrieved in step 610 to generate demand share of the item. Demand share of the item may be generated by generating and combining the demand share estimates of the items associated with the set of identifiers. Demand share estimates of the items associated with the set of identifiers may be combined by computing average or mean of the demand share estimate values. Demand share estimates of the items associated with the set of item identifiers may be computed upon failure to directly compute the demand share estimate of the item associated with the item identifier in step 610. Demand share module 313 may fail to compute the demand share estimate of the item directly if there is very little data for the item. For example, a new item may not have enough sale orders to use it to determine demand share in a geographical region. In another instance, a slow selling or expensive item may not generate enough sale orders to determine demand share estimate directly for the item. In some embodiments, demand share estimates of the items associated with the set of identifiers is aggregated and adjusted to the number of orders of the item associated with the item identifier in step 610.

A set of item identifiers associated with an item may represent an item segment. An Identified segment may include items related to the item identified in step 610. Item segments may be pre-defined and stored in segment data 324 of data store 320. Segment data 324 may be updated at regular intervals or may be requested as part of the item inventory estimation request (e.g., inventory estimation request 350) received in step 610.

Item segment data may be determined based on the similarity of items. Item similarity may be determined using the statically assigned labels of an item. A segment of items may have a set of common labels between the items in the segment. For example, books of various genres may all be meant for children and may include a common children book label and may be considered together as a segment of items. In some embodiments, segment data may be determined dynamically based on order data. For example, items purchased together and/or having the same labels may be considered part of the same segment. In some embodiments, the rules for determining segment data may be configurable as part of an inventory estimation request. A user may provide segmentation configuration rules as part of inventory estimation request 350. Upon determination of segmentation rules, demand share module 312 may determine the share of the total orders of a set of items belonging to a segment in a particular geographical region.

In step 650, inventory estimation system 310 may calculate mean and variance of demand share of item in geographical region determined in step 640. Inventory estimation system 310 may calculate mean and variance of demand share of item in a geographical region by combining mean and variance estimates of the overall demand forecast of the item with the demand share of the item in the geographical region.

In step 660, inventory estimation system 310 may determine the service level associated with the geographical region of the item associated with the item identifier determined in step 610. Inventory estimation system 610 may determine service level requirements from a received request for target inventory estimation (e.g., inventory estimation request 350).

Service level requirements may be related to fraction of orders of an item satisfied by a geographical region. For example, service level of a geographical region may require a certain fraction of item orders of the total item order to be fulfilled by fulfillment centers in that geographical region. In some embodiments, service level of a geographical region may be based on number of orders of the orders directed to fulfillment centers (e.g., $3^{rd}$ party fulfillment centers 121A-C) in the geographical region are met and shipped from those fulfillment centers. In some embodiments, service level requirements are based on the stock rate of the item identified in step 610. A detailed description of service levels configuration and computation can be found in FIG. 3 description of service level data 328 above.

In step 670, Inventory estimation system 310 may generate target inventory estimation of the item associated. Inventory estimation system 310 may be generated by combining mean and variance estimates of the item calculated in step 630 with the demand share estimate of the item in the geographical region determined in step 640. In some embodiments, mean and variance estimates of demand share of the item in the geographical reason is also included in the combination to generate the target inventory estimation of the item. The target inventory value, based on mean and variance estimates of demand, may be set equal to the mean demana plus $$\frac{2c}{9b}$$

times the standard deviation of the demand, where c is the coefficient of variation of the demand, and b is the desired service level. This method is based on an extension to the Vysochanskij-Petunin inequality (Vysochanskij and Petunin 1980). If the probability distribution of the demand for an item has a unimodal distribution, the Vysochanskij and Petunin inequality gives a bound on the probability that the demand exceeds a given target value. Here we extend that result to obtain a bound on the expectation of the lost demand, i.e. the expected value of the overshoot over a certain target: it can be shown that if the demand distribution is nonnegative and unimodal, and the inventory target is set as in the formula above, then the average fraction of the demand lost is no larger than (1-b).

In step 680, inventory estimation system 310 may respond to the received item identifier with the generated target inventory estimation in step 670. Inventory estimation system 310 may respond over network 340. Inventory estimation system 310, upon completion of step 680, completes (step 699) executing method 600 on distributed computing system 400.

Figure 7:
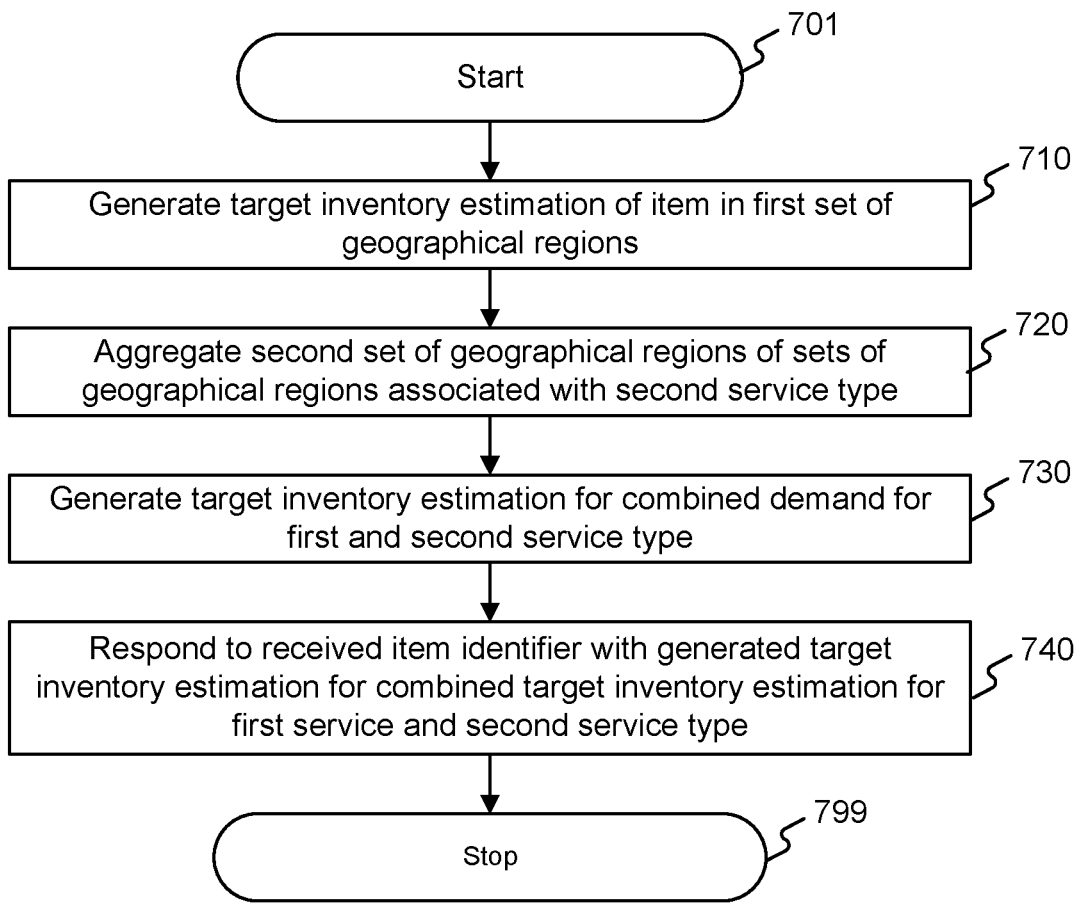
FIG. 7 is an illustrative flow chart of a method for determining target inventory estimation of an item at multiple geographical regions offering different services, consistent with the disclosed embodiments.

FIG. 7 is an illustrative flow chart of a method for determining target inventory estimation of an item at multiple geographical regions offering different services, consistent with the disclosed embodiments. In some embodiments, the steps of method 700 may be performed by inventory estimation system 310 for purposes of illustration. It will be appreciated that the illustrated method may be altered to modify the order of steps, or further include additional steps.

In step 710, inventory estimation system 310 may generate target inventory estimation of an item in first set of geographical regions. Inventory estimation system 310 may employ method 600 described in FIG. 6 description above to compute the target inventory estimation of each geographical region of the first set of geographical regions. The first set of geographical regions (e.g., sub region 510 of FIG. 5 with fulfillment centers 511, 512, 533, and 534) may be selected from sets of geographical regions (e.g., sub regions 510 and 520) covering all the area (e.g., overall region 500) served by system 100 to satisfy, ship and track item orders. Inventory estimation system 310 may determine first set of geographical regions which share a common first service type. Inventory estimation system 310 may represent the first set of geographical regions sharing first service type as a group, such as fulfillment center groups 530 and 540. Inventory estimation system 100 may select the first set of geographical regions that are part of the geographical region associated with the item estimation request (e.g., item estimation request 350 of FIG. 3).

In step 720, inventory estimation system 310 may aggregate a second set of geographical regions associated with second service type that form part of the geographical region associated with the item estimation request. The second set of regions are regions which do not form a group such as first set of geographical regions. For example, an inventory estimation request for sub region 510 may include fulfillment center group 530 with fulfillment centers 533 and 534 acting as first set of geographical regions and the fulfillment centers 511 and 512 acting as second set of geographical regions. The second set of geographical regions may include one or more different service types offered by their fulfillment centers and do not form a group. In some embodiments, the lack of grouping may be based on the type of item for which target inventory estimation is requested. For example, a target inventory estimation request for fresh meat may need geographical regions with cold storage facility. In another instance, a target inventory estimation request for fresh produce may need regions with overnight shipping capability. Inventory estimation system 310 may aggregate second set of geographical regions as a group temporarily for a certain type of item for which target inventory estimation was requested.

In step 730, inventory estimation 310 may generate target inventory estimation for combined demand for first and second types of service offered by first set and second set of geographical regions respectively. Inventory estimation 310 may determine the target inventory estimations of each geographical region in the second set of geographical regions before combining them with target inventory estimation of the first geographical region. Inventory estimation system 310 may combine target inventory estimations of first and second set of regions by adding the target inventory estimation values of the two sets of regions. In some embodiments, inventory estimation system 310 may need to adjust the combined value of target inventory estimation to satisfy service level of the combined geographical region of first and second set of geographical regions. For example, the service level requirements of the combined first and second set of geographical regions may be lower than the individual service levels of first and second set of regions and thus a lower target inventory estimation value would meet the combined region service level requirements.

In step 740, inventory estimation system 310 may respond to received item identifier with generated target inventory estimation for combined target inventory estimation for first and second service type as served by first and second set of geographical regions. Inventory estimation system 310, upon completion of step 740, completes (step 799) executing method 700 on distributed computing system 400.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for target inventory estimation of a geographical region, the system comprising:
   at least one memory storing instructions; and
   at least one processor configured to execute the instructions to perform operations comprising:
   receive an item identifier associated with an item for inventory estimation as an input to the system for target inventory estimation for the item in a geographical region;
   access a demand share estimate of the item associated with the received item identifier in the geographical region, a mean of the demand share estimate, and a variance of the demand share estimate;
   determine overall demand forecast of the item associated with the received item identifier, wherein the overall demand forecast of the item is based on order data associated with the item;
   calculate mean of the overall demand forecast and variance of the overall demand forecast, wherein the mean and variance of the overall demand forecast of the item are based on previously determined overall demand forecast of the item;
   determine a service level associated with the geographical region, wherein the service level of the geographical region is based on availability of one or more items at the geographical region to satisfy orders for the one or more items;

generate target inventory estimation of the item associated with the received item identifier in the geographical region based on the mean and variance of the overall demand forecast of the item, and the mean and variance of the demand share estimate of the item in the geographical region, wherein the generated target inventory estimation meets the service level of the geographical region; and respond to the received item identifier with the generated target inventory estimation.

2. The computer-implemented system of claim 1, wherein accessing mean and variance of the demand share estimate of the item associated with the received item identifier in the geographical region includes:

calculating mean and variance based on the combination of demand share estimation of the item in the geographical region and the mean and variance of the overall demand forecast of the item.

3. The computer-implemented system of claim 1, wherein accessing demand share estimate of the item associated with the received item identifier in the geographical region includes:

determine a set of item identifiers associated with a segment of items associated with in the geographical region related to the item associated with the received item identifier;

determine demand share estimates of the segment of items associated with the set of item identifiers in the geographical region; and generate demand share estimate of the item associated with the received item identifier by combining demand share estimates of the segment of items associated with the set of identifiers in the geographical region.

4. The computer-implemented system of claim 3, wherein the segment of items is related to each other, wherein the relationship is based on at least one of: similarity of type of items of the segment; or order combinations including the segment of items.

5. The computer-implemented system of claim 3, wherein combining demand share estimates of the segment of items associated with the set of identifiers in the geographical region includes:

calculate average of demand share estimates of the segment of items.

6. The computer-implemented system of claim 1, wherein probability distribution of the overall demand forecast of the item associated with the received item identifier is at least one of: unimodal or non-negative.

7. The computer-implemented system of claim 1, wherein determining service level associated with the geographical region is performed on a just-in-time basis.

8. The computer-implemented system of claim 1, wherein the service level associated with the geographical region is based on at least one of:

desired in stock rate of the item; or threshold of fraction of orders served from a first region served by a second region.

9. The computer-implemented system of claim 1, wherein the service level associated with the geographical region is based on at least one of:

type of the item associated with the received item identifier; or type of delivery service for the orders associated with the item associated with the received item identifier.

10. A computer-implemented method for target inventory estimation of a geographical region, the method comprising:

receiving an item identifier associated with an item for inventory estimation as input to the system for target inventory estimation for the item in a geographical region;

accessing a demand share estimate of the item associated with the received item identifier in the geographical region, mean of the demand share estimate, and variance of the demand share estimate;

determining overall demand forecast of the item associated with the received item identifier, wherein the overall demand forecast of the item is based on order data associated with the item;

calculating mean of the overall demand forecast and variance of the overall demand forecast, wherein the mean and variance of the overall demand forecast of the item are based on previously determined overall demand forecast of the item;

determining a service level associated with the geographical region, wherein the service level of the geographical region is based on availability of one or more items at the geographical region to satisfy order for the one or more items;

generating target inventory estimation of the item associated with the received item identifier in the geographical region based on the mean and variance of the overall demand forecast of the item, and the mean and variance of the demand share estimate of the item in the geographical region, wherein the generated target inventory estimation meets the service level of the geographical region; and responding to the received item identifier with the generated target inventory estimation.

11. The computer-implemented system of claim 10, wherein accessing mean and variance of the demand share estimate of the item associated with the received item identifier in the geographical region includes:

calculating mean and variance based on the combination of demand share estimation of the item in the geographical region and the mean and variance of the overall demand forecast of the item.

12. The method of claim 10, wherein accessing a demand share estimation of the item associated with the received item identifier in the geographical region includes: determine a set of item identifiers associated with a segment of items associated with the geographical region related to the item associated with the received item identifier; and determine a demand share estimation of the segment of items associated with the set of item identifiers in the geographical region.

13. The method of claim 12, wherein the segment of items is related to each other, wherein the relation is based on at least one of:

similarity of type of items of the segment; or order combination including the segment of items.

14. The method of claim 11, wherein the probability distribution of the overall demand forecast of the item associated with the received item identifier is at least one of: unimodal or non-negative.

15. The method of claim 11, wherein determining service level associated with the geographical region is performed on a just-in-time basis.

16. The method of claim 11, wherein the service level associated with the geographical region is based on at least one of:

desired in stock rate of the item; or threshold fraction of orders served from a first region served by a second region.

17. The method of claim 11, wherein the service level associated with the geographical region is based on at least one of:
- type of the item associated with the received item identifier; or
- type of delivery service for the orders associated with the item associated with the received item identifier.

18. The computer-implemented system of claim 1, wherein the at least one processor is further configured to refresh, at a set time interval, the service level associated with the geographic region and generate a new target inventory estimation of the item based on the refreshed service level.

19. The computer-implemented system of claim 18, wherein the at least one processor determines the set time interval for the refresh of the service level using a machine learning model and at least one of: data on storage capacity or data on throughput capacity.

* * * * *